June 24, 1930. A. S. HOWELL 1,767,848
MOTION PICTURE CAMERA AND THE LIKE
Original Filed Aug. 30, 1926  3 Sheets-Sheet 1

Inventor
Albert S. Howell
by Miehle & Miehle,
Attorneys

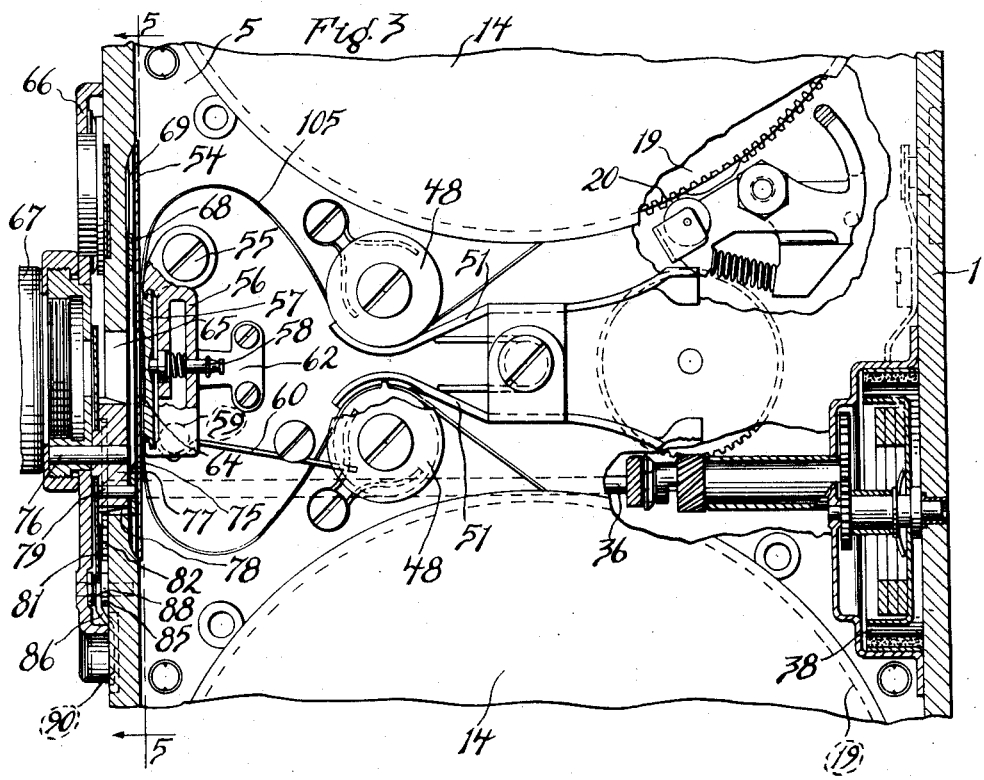
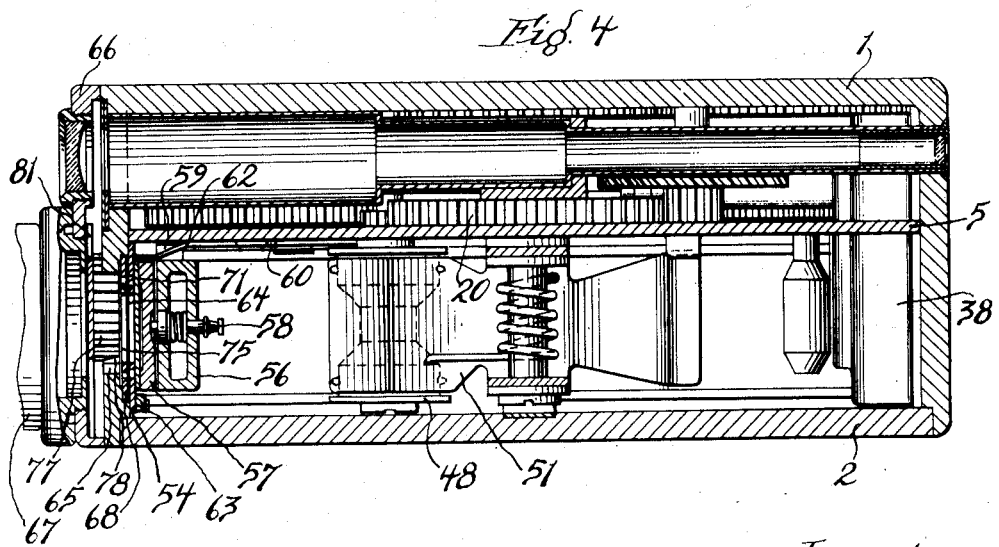

June 24, 1930.   A. S. HOWELL   1,767,848
MOTION PICTURE CAMERA AND THE LIKE
Original Filed Aug. 30, 1926   3 Sheets-Sheet 3
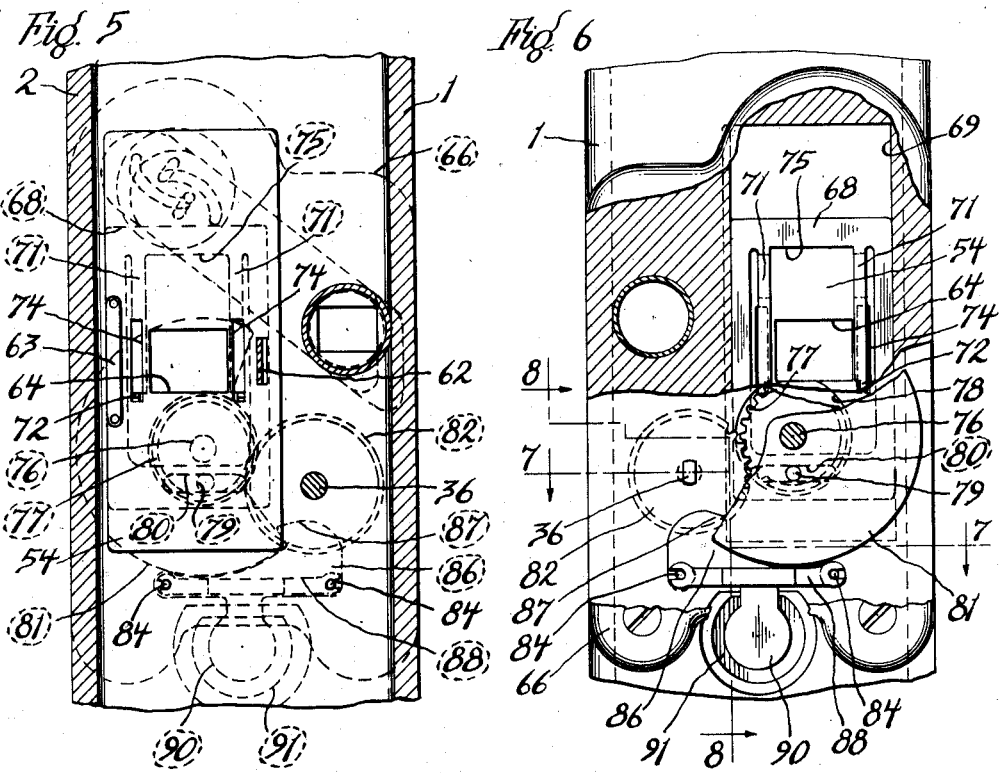
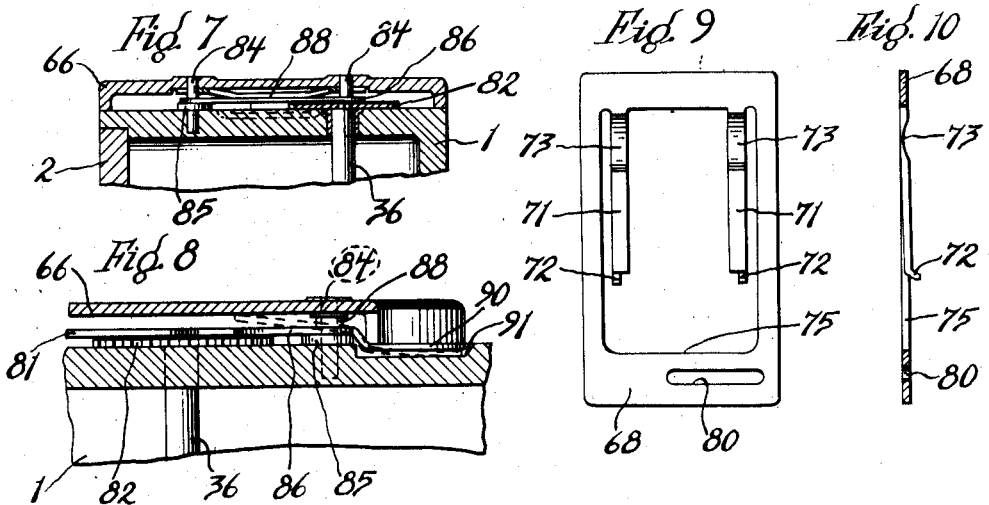
Inventor
Albert S Howell
By Miehle + Miehle,
Attorneys Patented June 24, 1930

1,767,848

UNITED STATES PATENT OFFICE

ALBERT S. HOWELL, OF CHICAGO, ILLINOIS, ASSIGNOR TO THE BELL & HOWELL COMPANY, OF CHICAGO, ILLINOIS, A CORPORATION OF ILLINOIS

MOTION-PICTURE CAMERA AND THE LIKE

Original application filed August 30, 1926, Serial No. 132,475. Divided and this application filed January 30, 1928. Serial No. 250,377.

My invention relates particularly to spring motor driven motion picture cameras although not limited to this use alone.

The main features of the invention relate to the provision of a motion picture camera with a view toward lightness, compactness, ease, and convenience of operation, simplicity and efficiency, and convenience in assembly and accessibility of operating parts.

With these features in view my invention consists in certain features of novelty in the construction, combination, and arrangement of parts by which the said features and certain other features are effected all as fully described with reference to the accompanying drawings and more particularly pointed out in the claims.

In the said drawings—

Figure 3 is an enlarged partial view similar to Figure 2 with parts broken away and in section.

Figure 4 is an enlarged section on the line 4—4 of Figure 1.

Figure 5 is a partial section on the line 5—5 of Figure 3.

Figure 6 is a partial front view with parts broken away and in section.

Figure 7 is a partial section on the line 7—7 of Figure 6.

Figure 8 is a partial section on the line 8—8 of Figure 6.

Figure 9 is an enlarged rear view of the intermittent feed shuttle, hereinafter described.

Figure 10 is a side elevation of the intermittent feed shuttle.

Like characters of reference indicate like parts in the several views.

Figure 1:
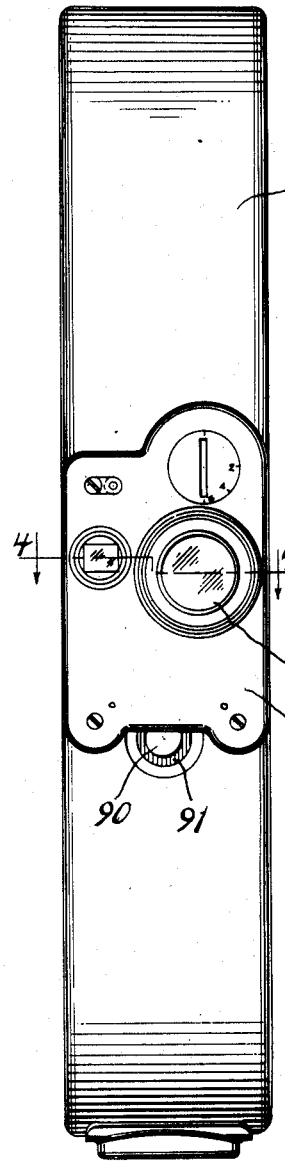
Figure 1 is a front view of a motion picture camera embodying the features of my invention.
Figure 2:
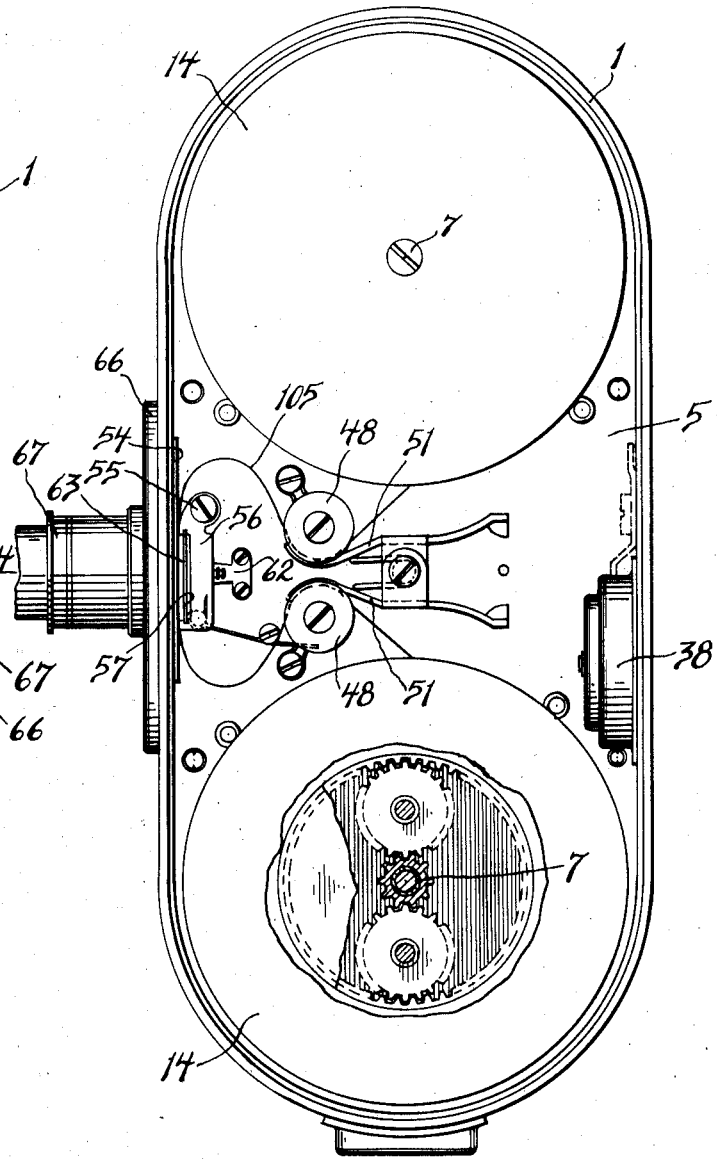
Figure 2 is a side view of the same with the cover thereof removed and parts broken away and in section.

Referring to the drawings 1 designates a vertical elongated casing which is open at one side, and said open side is closed by a cover 2 releasably secured to the casing in a manner unnecessary to be described. See Figures 1, 2, and 4.

A frame plate 5 is detachably secured in the casing intermediate and in parallelism with the sides thereof.

The upper and lower ends of the casing 1 are semicircular on vertically spaced transverse axes, and disposed on these axes and projecting from the frame plate 5 outwardly toward the open side of the casing are spindles, generally indicated at 7, upon which are mounted in edgewise alinement, for axial removal and replacement over the projecting ends thereof, revoluble film reels 14. See Figure 2.

Disposed between the frame plate 5 and the closed side of the casing 1 are two power spring devices, generally indicated at 19, which are disposed coaxially with respective reel spindles 7 and in spaced edgewise alinement. See Figure 3. These power spring devices are connected in parallel and drive the mechanism of the camera through gearing 20 and a forwardly and rearwardly extending shaft 36 driven from the gearing 20, the gearing 20 and the shaft 36 being disposed between the frame plate 5 and the closed side of the casing 1. See Figures 3 and 4. A speed governor 38 disposed at the rear of the casing is driven from the rear end of the shaft 36 and serves to maintain operation of the camera mechanism at a uniform speed. Vertically spaced constant feed film sprockets 48 are carried by the frame plate 5 between the reels 14 and project outwardly therefrom toward the open side of the casing and are driven from the gearing 20 in a manner unnecessary to be described, these sprockets being provided with releasable film retaining members 51.

A vertically disposed intermittent film feed guide is associated with the front wall of the casing 1 intermediately of the reel spindles and consists as follows. See Figures 2, 3, 4, and 5. A vertically elongated rectangular plate 54 is secured against the rear face of the front wall of the casing 1 adjacent the open side of the casing, and constitutes the front face guide wall of the guide. Carried for pivotal movement at its upper end on a transverse axis, by means of a suitable mounting 55 carried by the frame plate 5, and disposed between the frame plate 5 and the open side of the casing 1 is a guide block 56 on which is mounted, for limited movement forwardly, a transverse guide plate 57 which is yieldably urged to its forward position with respect to the block 56 by a suitable spring device 58. The block 56 and the plate 57 as so related constitute the rear face guide element of the guide. The block 56 when in film guiding position is, together with the plate 57, parallel with the front face guide plate 54 for guiding a film, and the block 56 is releasably held in this position by means of a stud 59 on the lower end of the block 56 adjacent the frame plate 5 and a notched spring arm 60 mounted on the frame plate 5 and engaging said stud with the notch thereof. See Figures 5 and 6. Abnormal rearward pressure on the block 56 will release the stud 59 from the notch in the spring arm for rearward movement of the block 56 to open the guide for lacing film in and unlacing the same from the guide, it being obvious that forward movement of the block 56 into its forward position effects reengagement of the stud 59 with the notch of the spring arm 60. A flat spring 62 is secured on the frame plate and extends across the plane of a film in the guide at the inner edge thereof to provide an inner edge guide for the film, and a vertical rail 63 secured on the rear face of the front face guide plate 54 adjacent its outer edge to form an outer edge guide for the film. The pressure of the spring device 58 and the spring 62 exert sufficient pressure on a film in the guide to retain the same in registry while the film is at rest in the guide.

The front face guide plate 54 is provided with an exposure aperture 64 disposed intermediate the plate 57, and the front wall of the casing 1 is provided with an exposure opening 65 registering with the exposure aperture 64 for the exposure of film in the guide. A housing member 66 is secured on the front face of the front wall of the casing 1 in front of the intermittent film feed guide and forms a narrow transverse enclosure with the front wall of the casing. A photographic lens 67 of a usual type is mounted on the front of the housing member 66 in alinement with the exposure aperture 64 for the exposing of film thereat.

An intermittent film feed shuttle 68 of elongated rectangular form is disposed longitudinally of and in parallelism with the front face guide plate 54 and immediately in front of the same and is engaged for vertical reciprocating movement longitudinally of the guide in a slide 69 formed in the rear face of the front wall of the casing 1. See Figures 3, 4, 5, and 6. The shuttle plate 68 has a pair of parallel resilient arms 71 struck from intermediate metal of the plate and connected to one marginal end of the plate and extending longitudinally of the movement thereof toward the other end of the plate. See Figures 9 and 10. These arms are set to extend rearwardly out of the plane of the plate and the free ends thereof are formed, as designated at 72, for engagement with perforations of a film in the intermittent film feed guide to move the film downwardly in the guide with the down stroke of the shuttle plate and to slide over the film on the up stroke of the shuttle plate for engagement with other perforations of the film. The arms 71 have portions thereof adjacent their connected ends of reduced thickness, as designated at 73, to localize bending thereof. The arms engage film in the intermittent film feed guide through longitudinal slots 74 in the front face guide plate 54 at respective sides of the exposure aperture 64, and intermediate metal of the shuttle plate is removed to provide a marginal formation and an intermediate opening 75 exposing the exposure aperture 64 of the front face guide plate. See Figures 3, 4, 5, and 9.

Secured on the front of this housing member 66 is a stud 76 which extends rearwardly therefrom in the enclosure thereof normal to the plane of the shuttle plate 68 and the film guide. A spur gear 77 is revolubly mounted on this stud and extends rearwardly from the housing member in the enclosure thereof, and the stud and gear are disposed below and adjacent the exposure aperture 64 and exposure opening 65 on an axis intermediate the sides of the guide, they projecting into an additional opening 78 through the front wall of the casing 1 to a plane adjacent the shuttle plate. Secured on the gear 77 is a crank stud 79 which engages a transverse slot 80 in the lower marginal end portion of the shuttle plate for reciprocation of the shuttle plate with rotation of this gear to intermittently feed a film in the guide. A segmental light shutter 81 is disposed in the enclosure of the housing member 66 and is secured on the gear 77 at the front thereof for intermittently covering the exposure aperture 64 or while the film is being intermittently moved in the guide.

Secured on the front end of the operating shaft 36 is a spur gear 82 disposed in the enclosure of the housing member 66 immediately to the rear of the shutter 81. This gear, as is the shaft 36, is disposed on an axis to one side of the intermittent film feed guide and meshes with the gear 77 for driving the same to effect rotation of the shutter 81 and reciprocation of the shuttle plate 68.

It will be observed that the intermittent film feeding and exposing mechanism is simple and compact and particularly adapted for the general construction shown, and that the shuttle by reason of its construction and arrangement with the intermittent film feed guide engages perforations on both sides of a film in the guide immediately at the exposure aperture with obvious advantage.

A pair of transversely spaced studs 84 are mounted on the front of the housing member 66 and extend rearwardly in the enclosure thereof below the path of the shutter and engage in bores in the front wall of the casing 1. See Figures 3, 5, 6, 7, and 8. Washers 85 on respective studs 84 abut the front face of the casing 1 and form forwardly facing shoulder formations on the studs. A stop member 86 extending in the enclosure of the housing member 66 is mounted on the studs 84 for tilting movement normal to the plane of the shutter 81, and is provided with an upwardly extending stop formation 87 movable in the tilting movement of the stop member into and out of the plane of the shutter and adapted when in the plane of the shutter to engage the leading edge of the shutter to stop rotation thereof and accordingly operation of the camera mechanism. When the stop formation 87 is out of the plane of the shutter, the shutter together with the camera mechanism is permitted to operate under the driving power of the aforementioned power spring devices. The stopping position of the stop member 86 is shown in full lines and the operation permitting position is shown in dotted lines in Figure 8. A flat bow spring 88 is mounted on the studs 84 in front of the stop member 86 and acts between the housing member 66 and the stop member to yieldably urge the stop member against the forwardly facing surfaces of the washers 85 for yieldably urging and maintaining the stop member in its stopping position with the stop formation in the plane of the shutter 81 and engaged with the leading edge thereof. The stop member 86 is provided with a downward extension 90 extending outwardly beyond the lower side of the housing member 66 into a recess 91 in the front face of the front wall of the casing 1 where this extension 90 is exteriorly exposed for manual operation of the stop member for controlling operation of the camera in an obvious manner. Thus is provided a simple and effective stop mechanism utilizing the leading edge of the shutter 81 as a stop formation and particularly adapted for the construction shown.

A film 105 in the camera is fed from the upper or feed reel 14 to and under the upper constant feed sprocket 48, thence with a compensating loop to the upper end of the intermittent film feed guide, thence downwardly through the guide, thence with another compensating loop to and over the lower constant feed sprocket 48, and thence finally to the lower or take up film reel 14 which is driven from the lower power spring device 19 through suitable mechanism unnecessary to be described. See Figures 2 and 3.

Certain structures shown herein or shown and described herein are fully described and claimed in my co-pending application for U. S. Letters Patent, Serial No. 132,475, filed August 30, 1926, for improvement in motion picture camera and the like, of which the present application is a division.

While I have described and shown the preferred embodiment of my invention I do not wish to be limited to the precise details of construction as changes may readily be made without departing from the spirit of my invention, but having thus described my invention, I claim as new and desire to secure by Letters Patent the following:

1. In an intermittent feeding device the combination of an elongated rectangular plate reciprocable longitudinally thereof, a pair of parallel resilient arms struck from intermediate metal of the plate and connected to one marginal end portion of the plate and extending longitudinally of the movement thereof toward the other end of the plate and adapted for engagement with a perforated film for intermittently feeding the same, said plate having intermediate metal thereof removed to provide a marginal formation, and revoluble means engaging a transverse slot in a marginal end portion of said plate for reciprocating the same.

2. In an intermittent feeding mechanism the combination of an elongated rectangular plate reciprocable longitudinally thereof, a pair of parallel resilient arms struck from intermediate metal of the plate and connected to one marginal end portion of the plate and extending therefrom longitudinally of the movement thereof toward the other end of the plate and adapted for engagement with a perforated film for intermittently feeding the same, said plate having intermediate metal thereof removed to provide a marginal formation, said arms having portions thereof adjacent their connected ends of reduced thickness to localize bending thereof, and a revoluble crank device engaged in a slot in the other marginal end portion of the plate for reciprocating the same.

3. In an intermittent film feeding device the combination of an intermittent film feed guide provided with an exposure aperture in a face wall thereof, an elongated rectangular shuttle plate disposed longitudinally of and in parallelism with said face wall and overlying the same and reciprocable longitudinally thereof, a pair of parallel resilient arms struck from intermediate metal of said shuttle plate and connected to one marginal end portion of the plate and extending longitudinally of the plate toward the other end thereof and extending through longitudinal slots in said face wall on respective sides of said exposure opening for engagement with a perforated film in said guide for intermittently feeding the film, said plate being provided with an intermediate opening providing a marginal formation and exposing said exposure aperture, and a revoluble crank device engageable in a transverse slot in the other marginal end portion of said shuttle plate for reciprocating the same.

4. In a motion picture machine the combination of an intermittent film feed guide provided with an exposure aperture in the front face wall thereof, a shuttle plate disposed in a plane overlying said front face wall and reciprocable longitudinally of the guide and provided with an intermediate opening exposing said exposure aperture and providing a marginal formation, spring pressed ratchet members on said shuttle on respective sides of said exposure aperture for engaging a perforated film in said guide for intermittently feeding the film, a revoluble crank device disposed adjacent said exposure aperture on an axis normal to the plane of said guide and intermediate the sides thereof and extending forwardly of the shuttle plate and engaging a transverse slot in a marginal end portion of the shuttle plate for reciprocating the same, a segmental light shutter secured on said crank device forwardly of said shuttle plate for intermittently covering said exposure aperture, a spur gear on said crank device between said shuttle and said shutter, and a second revoluble spur gear disposed on an axis to one side of said guide and meshing with said first mentioned spur gear for driving the same.

5. In a motion picture camera the combination of a casing having a light opening in its front wall, an intermittent film feed guide in the casing and including a front face guide plate secured against the rear face of said front wall and provided with an exposure opening registering with said light opening, a shuttle plate disposed in parallelism with said face guide plate immediately in front of the same and engaged in a slide in the rear face of said front wall for reciprocation longitudinally of the guide and provided with an opening exposing said exposure opening, means on said shuttle plate for engaging a perforated film in said guide for intermittently feeding the same, and revoluble means for reciprocating said plate.

6. In a motion picture camera the combination of a casing having a light opening in its front wall, an exposure apertured intermittent film feed guide and an associated film feed shuttle plate disposed in parallelism with said guide immediately in front of the same and reciprocable longitudinally of said guide and provided with a light opening coordinated with the exposure aperture of said guide and said guide and shuttle plate being disposed at the rear face of said front wall, a lens carrying housing member secured on the front face of the front wall of said casing and forming an enclosure therewith about said light opening, a revoluble member carried by said housing member and extending rearwardly therefrom in said enclosure and through an opening in the front wall of said casing for reciprocating said shuttle plate, a light shutter disposed in said enclosure and secured for rotation with said revoluble member for intermittently covering said exposure aperture, a spur gear on said revoluble member, a second spur gear within said enclosure and meshing with said first mentioned spur gear, and an operating shaft on which said second spur gear is mounted and disposed to one side of said guide and shuttle plate and extending rearwardly from said enclosure into said casing.

7. In a spring driven motion picture camera the combination of a casing, a housing member detachably secured on the front face of the front wall of said casing and forming a narrow transverse enclosure therewith, intermittent feeding and exposing mechanism including a revoluble segmental light shutter disposed in a transverse plane in said enclosure, a pair of spaced studs extending rearwardly from said housing member in said enclosure, a stop member extending in said enclosure and mounted on said studs for tilting movement normal to the plane of the shutter into and out of position to engage the leading edge of said shutter for stopping operation of said feeding and exposing mechanism, forwardly facing shoulder formations associated with said studs at the rear of said stop member, a flat bow spring mounted on said studs in front of said stop member and yieldably urging said stop member against said shoulder formations to yieldably position the stop member engagement with said shutter, said stop member extending outwardly beyond a side of said housing member into a recess in the front face of the front wall of said casing for manual operation of the stop member out of engagement with said shutter.

In witness whereof I hereunto affix my signature this twenty-seventh day of January, 1928.

ALBERT S. HOWELL.